United States Patent

Provi et al.

[15] 3,666,031
[45] May 30, 1972

[54] DAMAGE RESISTANT BATHROOM SCALE CONSTRUCTION

[72] Inventors: Mike A. Provi; S. Robert Guinter, both of Rockford, Ill.

[73] Assignee: The Brearley Company, Rockford, Ill.

[22] Filed: Apr. 10, 1970

[21] Appl. No.: 27,368

[52] U.S. Cl. .................... 177/186, 177/174, 177/230, 177/234, 177/256
[51] Int. Cl. ........................... G01g 23/06, G01g 23/26
[58] Field of Search ............ 177/234, 174, 256, 164, 184, 177/186, 230

[56] References Cited

UNITED STATES PATENTS

| 2,766,038 | 10/1956 | Weber | 177/230 |
| 2,788,963 | 4/1957 | Provi | 177/234 X |
| 3,193,034 | 7/1965 | Hutchinson et al. | 177/234 |
| 3,460,642 | 8/1969 | Provi et al. | 177/256 |

FOREIGN PATENTS OR APPLICATIONS

| 375,547 | 6/1932 | Great Britain | 177/234 |
| 765,678 | 1/1957 | Great Britain | 177/186 |
| 1,070,904 | 6/1967 | Great Britain | 177/256 |

Primary Examiner—Robert S. Ward, Jr.
Attorney—Andrew F. Wintercorn

[57] ABSTRACT

This scale's weight indicating mechanism is protected against destructive shear leads being imposed on the rack and pinion through the weight indicating means, first by providing a cushioning spring abutment for the rack near the return end of the slot for cushioning effect. Secondly, an elongated rotary floating stop plate is provided for the weight indicating dial, having widely spaced stop projections at the pivoted end for abutment with opposite sides of a boss on the dial adapter for one portion of the greatly increased range of free rotation of the dial in either direction, a stop projection on the stop plate on its other end being arranged to engage either side of a fixed stop to provide plenty of additional free turning, and hence regardless of "flywheel" action of the dial, no damage is done to the vulnerable scale parts mentioned.

13 Claims, 6 Drawing Figures

Patented May 30, 1972

INVENTORS:
MIKE A. PROVI
S. ROBERT GUINTER

ATTORNEY

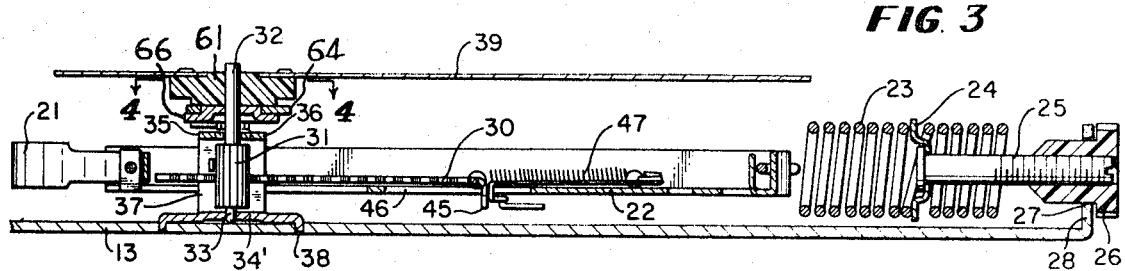
FIG. 3
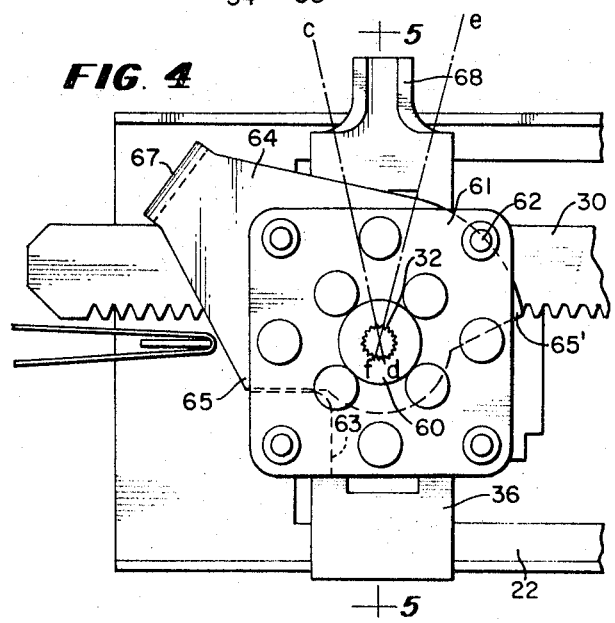
FIG. 4
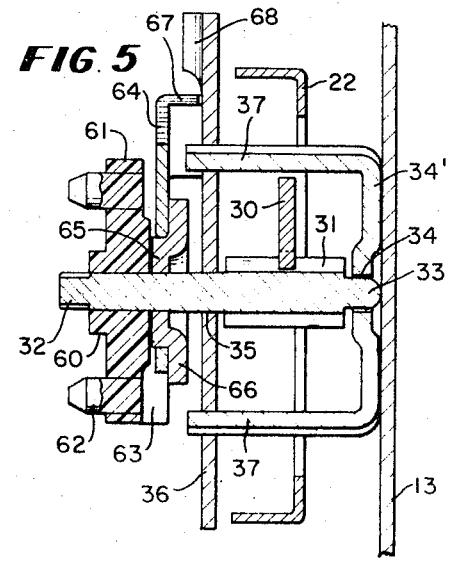
FIG. 5
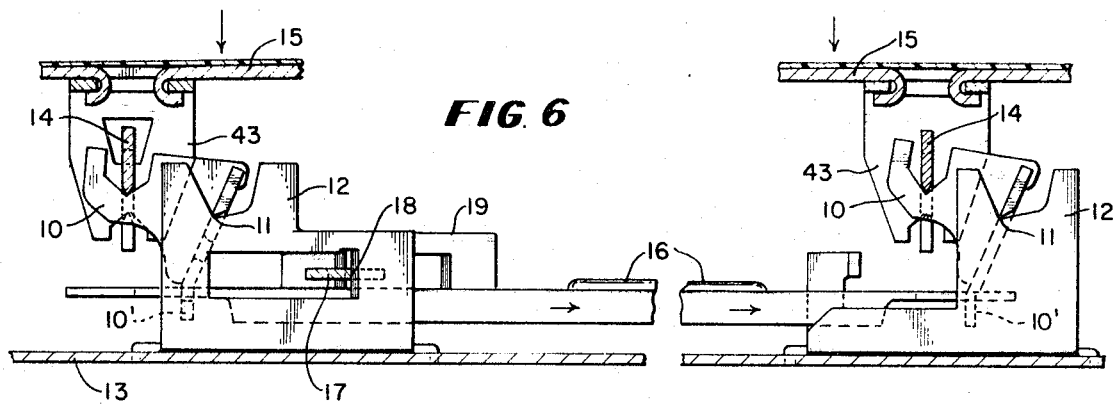
FIG. 6
INVENTORS:
MIKE A. PROVI
S. ROBERT GUINTER
ATTORNEY

DAMAGE RESISTANT BATHROOM SCALE CONSTRUCTION

This invention relates to a damage resistant bathroom scale construction designed with a view to going much farther than has theretofore been regarded as necessary in the direction of safeguarding the relatively delicate weight indicating mechanism against damage in the event someone, set upon doing serious damage, jumps up and down on the scale platform, purposely even timing the jumps and their violence in relation to the oscillations of the dial with a view to accomplishing the greatest possible destructiveness.

Heretofore, weight indicating mechanisms on bathroom scales were protected usually by light spring restrained lost-motion of the rack from shocks and strains only to the small extent considered necessary in the event of rougher than ordinary usage, as when someone jumped onto or off from the scale platform, instead of stepping on or off in the usual way. However, such minor precautions are not really enough to prevent serious damage if the scale is deliberately subjected to extremely rough usage, so, in accordance with our invention, we provide novel two-way spring cushioning means for the rack, along with its lost-motion, allowing cushioned overtravel of the rack and dial in both directions with only a lesser degree of yield in the weight indicating direction than in the reverse direction, thereby insuring accurate weight readings when the parts return to their normal positions, and we also provide novel rotary floating stop means in connection with the dial to allow well over a full free turn in either direction before a positive stop is engaged, thereby obtaining the same accuracy of weight indication while effectively thwarting any efforts to damage the weight indicating mechanism by reason of "flywheel action" of the dial, which, depending upon the kind of material used in the dial, could otherwise become a big factor in the damage done to the scale.

The invention is illustrated in the accompanying drawings, in which:

FIG. 3 is a cross-section on the line 3—3 of FIG. 2 on a larger scale;

FIG. 4 is a plan view of the novel dial mounting with the dial removed, taken on the line 4—4 of FIG. 3 on a still larger scale;

Figure 1:
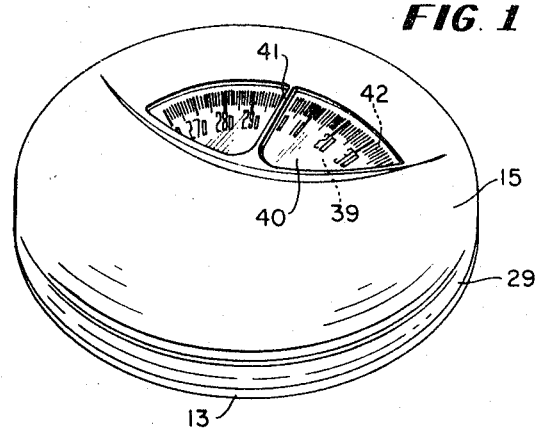
FIG. 1 is a perspective view of a bathroom scale embodying the improvements of our invention.
Figure 2:
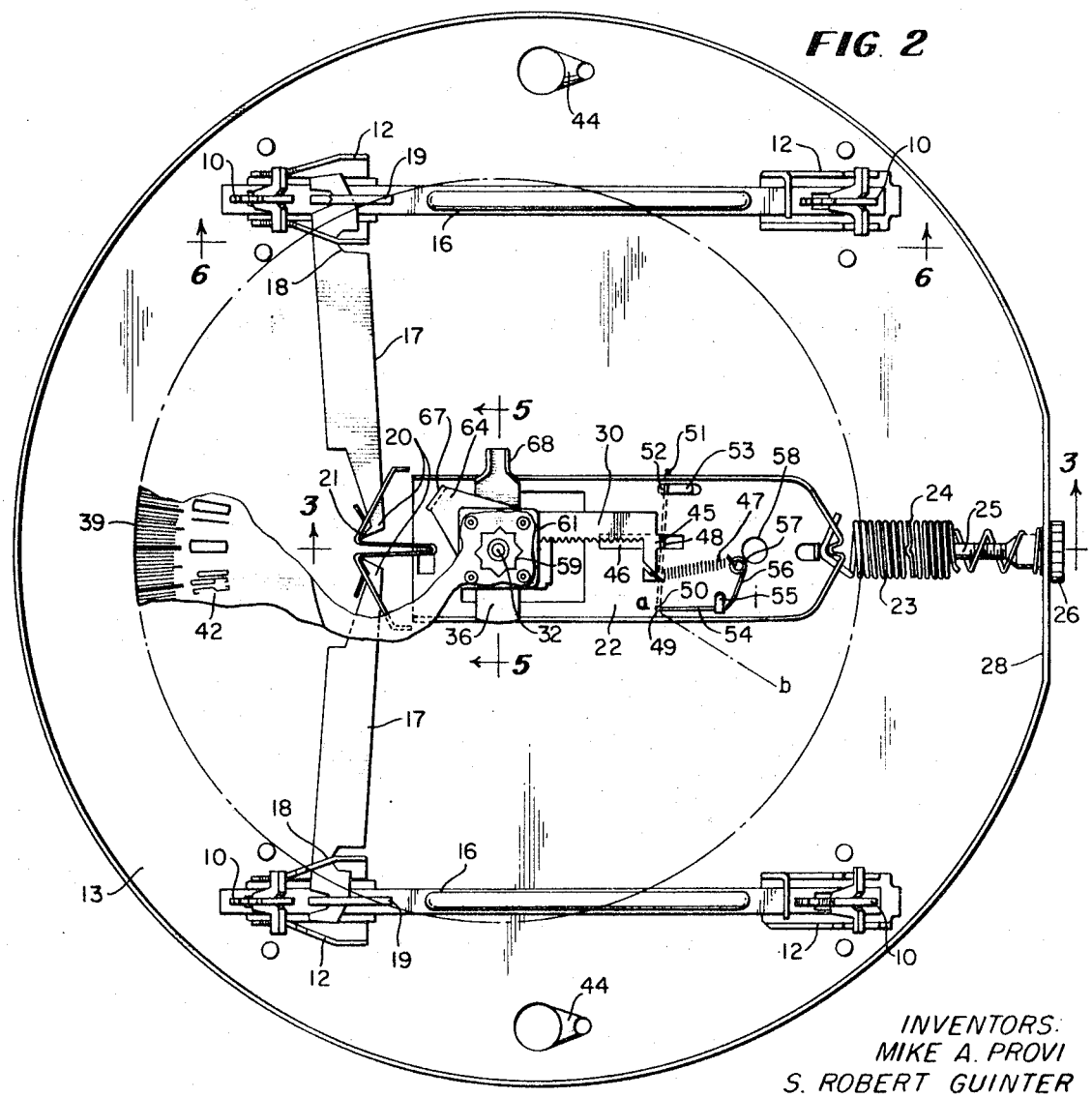
FIG. 2 is a plan view of the scale with the platform removed and a large portion of the dial broken away to better disclose all the novel structural details therebeneath.

FIG. 5 is a cross-section on the line 5—5 of FIGS. 2 and 4 to still better illustrate the construction, and FIG. 6 is a cross-section on the line 6—6 of FIG. 2 on a larger scale showing how the weight is transferred from the platform to the pair of oscillatable weighing levers seen in FIG. 2.

The same reference numerals are applied to corresponding parts throughout the views.

Referring to the drawings, the bathroom scale in which the present improvements are illustrated is what is called a "low profile" bathroom scale, the construction of which is covered in the Provi et al, U.S. Pat. No. 3,460,642, in which the radical reduction in height was obtained by virtue of a novel arrangement of four small vertically disposed bell-crank levers 10, fulcrumed as at 11 on four brackets 12 mounted on the base 13, and having hangers 14 fulcrumed thereon to support the platform 15 at four widely rectilinearly spaced points. Two of these points are at opposite ends of each of two substantially parallel horizontally disposed bars 16 that are reciprocable horizontally in close parallelism to the base 13 and have the bell-crank levers 10 arranged to transmit thrust to the opposite ends thereof in the direction of the arrows shown in FIG. 6 when weight is applied to the platform 15, as indicated by the downwardly directed arrows in FIG. 6, the levers 10 having T-shaped lower end portions 10' received in slots in the opposite ends of the bars 16 for this purpose and for the purpose of supporting these bars 16 in slightly elevated relationship to the base 13. There is only a relatively small amount of reciprocatory motion given the bars 16 in each weighing operation. This small motion is multiplied by two elongated horizontally disposed oscillatable weighing levers 17 that are fulcrumed relative to the base as at 18, near their outer ends and operatively connected with the bars 16 at their outer ends, as indicated at 19, the inner ends 20 of the levers 17 being operatively connected, as at 21, to one end of an elongated horizontal plate 22 that has its other end attached to one end of the weighing spring 23 disposed horizontally above and parallel to the base 13. The other end of this weighing spring is adjustably fixed to a washer 24 that in turn is fixed to one end of a screw 25 threaded in a manually adjustable nut 26 rotatable in a hole 27 provided in the side wall 28 of the base 13, this nut 26 being conveniently arranged with respect to the downwardly projecting flange 29 on the platform 15 to permit easy turning of the nut relative to the screw in making what is usually called the "return-to-zero" adjustment of the scale. The horizontal plate 22 carries the rack 30 that meshes with the pinion 31, the stem 32 of which has its lower end 33 rounded for low friction point bearing contact on the base 13 and turning in the bearing 34 in plate 34' while the upper end portion turns in another bearing 35 in a horizontal plate 36 fixed to and supported upon the upper ends of two vertical arms 37 bent upwardly from the opposite ends of the bearing plate 34'. The latter, as seen in FIG. 3, has downwardly bent lugs 38 on its opposite ends fixed in slots in the base 13. The dial 39, the front half portion of which is visible through the usual window or lens 40 in the platform 15, is carried on the upper end of the stem 32 to turn with pinion 31 in each weighing operation relative to the usual index wire 41 mounted on the under side of the platform 15 and bisecting the window opening. It is understood, of course, that the platform 15 is supported in the usual way, as indicated at 43, on the four hangers 14 to transmit load to the four bell-crank levers 10, and also that the usual two laterally spaced tension springs (not shown), for holding the platform 15 in assembled relation to the base 13, are provided at opposite sides of the scale on vertical lines between the base and platform, the places for hooking the lower ends of such springs to the base 13 under a preload tension being indicated at 44 in FIG. 2.

In the scale shown in Provi et al, U.S. Pat. No. 3,460,642 the dial was operable by means of the rack 30 moving positively in one direction with the plate 22 and slidably guided for horizontal reciprocation relative to the plate by engagement of a T-shaped lug 45 on its one end in a longitudinal slot 46 provided in the plate 22, the rack being held normally against the front end of the slot and also urged laterally against the pinion 31 by means of a light tension spring 47 attached to the front end of the rack at one end and to the plate 22 at the other end, with a view to this lost-motion at 46 eliminating danger of damage being done to the pinion 31 and rack 30 if a person jumped onto or off from the platform 15. However, in the present improved construction, instead of having the rack 30 movable positively in the weight indicating direction with the plate 22, a light wire spring 48 extending transversely with respect to the T-shaped lug 45 and slot 46 in spaced relation to the front end of the slot has its one end 49 pivoted on a vertical axis relative to the plate 22 by being bent upwardly through a hole 50 in said plate, while its other end 51 bears against a shoulder 52 defined by one end of a lug 53 that is struck downwardly from the plate 22 and forwardly, this lug serving thereby both as a limit stop and guide for the movable end portion 51 of this spring wire, the latter being preloaded to a predetermined extent by forwarding bent arm 54 extending from the upper end of the pivot portion 49 approximately in the direction of the dotted line a–b in FIG. 2 before it is swung inwardly toward the plate 22 and hooked in place behind the lug 55 that is struck upwardly and horizontally from the plate 22. An inwardly bent end portion 56 on arm 54 has an eye 57 formed on the extremity thereof providing a convenient place for attaching one end of the previously described light tension spring 47 in lieu of having the same attached directly to the plate 22, as for example, in the hole 58. It should be clear from this description that the rack 30 is movable rearwardly sufficiently positively in the weight indicating direction with the plate 22 to give an accurate weight reading on the dial 39, but, in addition to the one-way protection afforded by the yield in the light tension spring 47 against damage being done to the rack and pinion if a person jumps onto or off the patform 15, the cushioning spring 48 serves to absorb shock in the other direction to further protect the rack and pinion against damage in the event the rack 30 is propelled by the dial 39 violently toward spring 48 by reason of a person jumping up and down repeatedly on the platform, even timing the jumps and the violence thereof in relation to the turning of the dial to place as much strain as possible on the weight indicating mechanism, enough to wreck the average scale not safeguarded against such vandalism.

In conclusion, the metal dial 39, which has an enlarged center hole 59 for ample clearance with respect to the hub 60 of the thermoplastic rectangular dial adapter 61, has four holes provided therein equidistant from the center hole 59 to receive the four vertical knobs 62 on the four corners of the adapter 61, so that the dial can be fastened permanently to the adaptor by upsetting the ends of the knobs 62 under heat and pressure. The adaptor has a generally rectangular boss 63 on its under side at one corner for abutment with the metal stop plate 64 at either of its stop projections 65 and 65', the stop projection 65 being shown in abutment with the boss 63 in FIG. 4. The stop plate 64 is freely rotatable otherwise with respect to the embossed cylindrical center portion 65 of a metal collar 66 that has a press fit on the stem 32 of pinion 31 so as to support the plate 64 at the proper elevation with respect to the adaptor 61, on the one hand, for engagement with the boss 63, and for engagement, on the other hand, of the downwardly projecting lug 67 with either side of the stop projection 68 provided on one end of the previously mentioned bearing plate 36, as indicated by lines cd and ef in FIG. 4. In this way, the stop plate has nearly a full revolution of free travel or lost-motion relative to the dial adaptor 61, and that, added to the amount of free travel or lost-motion of the dial adaptor's boss 63 relative to the stop plate projections 65 and 65' makes for easily enough free turning of the dial 39 in either direction before encountering a stop with any destructive force, even through the dial is made of a material tending to make a "fly-wheel action" otherwise a factor in the damage done to the scale by maltreatment.

In operation, the rack 30, which, as seen in FIG. 5, slides on the plate 22 and is guided in proper meshing engagement at all times with the pinion 31 by the adjacent upwardly bent leg 37 of the plate 34', transmits rotation to the dial 39 in the weight indicating direction when the plate 22 moves rearwardly, or to the left as seen in FIG. 2, by reason of deflection of weighing levers 17 against the resistance of the weighing spring 23. Of course, when the person being weighed steps off the scale platform 15, the dial 30 returns to zero with the plate 22 under action of the weighing spring 23, and spring 47 also helps to return the dial to zero by its pull on rack 30. Heretofore, there was only the small light spring 47 to protect the weight indicating mechanism against damage if a person jumped onto or off from the scale, the lug 45 in such a construction having positive abutment with the front (or right end) of slot 46, the spring 47 serving to bring the rack 30 back to a position with lug 45 in abutment with that end of the slot. However, with the kind of maltreatment described, a scale constructed along those conventional lines would have the teeth on rack 30 and pinion 31 stripped or damaged sufficiently to make the scale not at all reliable for further accurate weighing. The heavier wire spring 48, which is adapted to cushion the rack 30 if the rack returns with greater force than is normal, but otherwise functions to move the rack properly in the weight indicating direction, performs approximately half of what is required in the direction of safeguarding the scale against damage when it is subjected to the kind of maltreatment described. The other approximately half of the safe-guarding function is afforded by the floating rotary stop plate 64 that cooperates on the one hand with the dial adapter 61 by abutment on either side of the boss 63 and cooperates on the other hand by abutment on either side of stop 68 on the bearing plate 36, thereby allowing lost-motion turning of the dial through enough angularity in either direction before it comes into engagement with a positive stop. This removes the danger of having the dial 39 used as a fly-wheel when the scale is subjected to the kind of maltreatment previously described, regardless of the material used in the dial. In other words, the dial 39 and rack 30, by virtue of the floating stop plate 64, are sufficiently in floating relationship to one another to relieve the rack 30 and pinion 31 from destructive momentum that might otherwise be transmitted from the dial 39 to the pinion 31 and thence to rack 30.

It is believed the foregoing description conveys a good understanding of the objects and advantages of our invention. While a preferred embodiment of the invention has been illustrated and described, this is only for the purpose of illustration, and it is to be understood that various modifications in structure will occur to a person skilled in this art.

We claim:

1. In a weighing scale comprising a base, weighing levers fulcrumed thereon, a platform movably supported above said base on said levers, weighing spring means serving to resist deflection of said weighing levers under weight applied to the platform, a rotatable weight indicating dial, rack and pinion means movable in response to deflection of said weighing levers and connected to transmit rotation to said dial through an angularity in direct proportion to the weight applied to the platform so as to give an accurate weight indication, and a horizontally reciprocable plate in substantially parallel relationship to said base through which the weighing levers are connected with the weighing spring means and upon which the aforesaid rack rests for reciprocatory motion in each weighing operation, the rack having a lost-motion connection with said plate in a slot provided in the latter longitudinally thereof, the improvement which consists in providing, in combination, a relatively light spring connected with said rack tending normally to return the rack to one end of said slot, and a relatively heavier cushioning spring arranged for abutment by said rack in spaced relation to the return end of said slot, the former spring urging the rack toward the latter spring and the latter spring having no yield in transmitting weight indicating movement to said rack from said plate in the opposite direction in a normal weighing operation.

2. In a weighing scale comprising a base, weighing levers fulcrumed thereon, a platform movably supported above said base on said levers, weighing spring means serving to resist deflection of said weighing levers under weight applied to the platform, a rotatable weight indicating dial, rack and pinion means movable in response to deflection of said weighing levers and connected to transmit rotation to said dial through an angularity in direct proportion to the weight applied to the platform so as to give an accurate weight indication, and a horizontally reciprocable plate in substantially parallel relationship to said base through which the weighing levers are connected with the weighing spring means and upon which the aforesaid rack rests for reciprocatory motion in each weighing operation, the rack having a lost-motion connection with said plate in a slot provided in the latter longitudinally thereof, the improvement which consists in providing, in combination, a relatively light spring connected with said rack tending normally to return the rack to one end of said slot, and a relatively heavier cushioning spring arranged for abutment by said rack in spaced relation to the return end of said slot, the former spring urging the rack toward the latter spring and the latter spring having no yield in transmitting weight indicating movement to said rack from said plate in the opposite direction in a normal weighing operation, and means for positively limiting rotation of said weight indicating dial but only after more than a full turn in either direction whereby to further protect the rack and pinion from destructive shear load in the event of maltreatment of the scale.

3. In a weighing scale comprising a base, weighing levers fulcrumed thereon, a platform movably supported above said base on said levers weighing spring means serving to resist deflection of said weighing levers under weight applied to the platform, a rotatable weight indicating dial, rack and pinion means movable in response to deflection of said weighing levers and connected to transmit rotation to said dial through an angularity in direct proportion to the weight applied to the platform so as to give an accurate weight indication, and a horizontally reciprocable plate in substantially parallel relationship to said base through which the weighing levers are connected with the weighing spring means and upon which the aforesaid rack rests for reciprocatory motion in each weighing operation, the rack having a lost-motion connection with said plate in a slot provided in the latter longitudinally thereof, the improvement which consists in providing, in combination, a relatively light spring connected with said rack tending normally to return the rack to one end of said slot, and a relatively heavier cushioning spring arranged for abutment by said rack in spaced relation to the return end of said slot, the former spring urging the rack toward the latter spring and the latter spring having no yield in transmitting weight indicating movement to said rack from said plate in the opposite direction in a normal weighing operation, a dial adapter on which said weight indicating dial is mounted, said adapter being fixed to turn with the pinion, a floating rotary elongated stop plate rotatable relative to said pinion, said stop plate having spaced stops on the pivoted end thereof engageable after lost motion in either direction with opposite sides of a stop projection on said dial adapter to account for one portion of the free turning of said dial, said stop plate having a stop on its outer end arranged to strike either side of a fixed stop to account for a second and greater portion of the free turning of said dial.

4. In a weighing scale comprising a base, weighing levers fulcrumed thereon, a platform movably supported above said base on said levers, weighing spring means serving to resist deflection of said weighing levers under weight applied to the platform, a rotatable weight indicating dial, rack and pinion means movable in response to deflection of said weighing levers and connected to transmit rotation to said dial through an angularity in direct proportion to the weight applied to the platform so as to give an accurate weight indication, and a horizontally reciprocable plate in substantially parallel relationship to said base through which the weighing levers are connected with the weighing spring means and upon which the aforesaid rack rests for reciprocatory motion in each weighing operation, the rack having a lost-motion connection with said plate in a slot provided in the latter longitudinally thereof, the improvement which consists in providing, in combination, a relatively light spring connected with said rack tending normally to return the rack to one end of said slot, and means for positively limiting rotation of said weight indicating dial but only after at least a full turn in either direction, this free turning of the dial coupled with the spring restrained lost-motion of the rack protecting the rack and pinion from shear load in the event of maltreatment of the scale.

5. In a weighing scale comprising a base, weighing levers fulcrumed thereon, a platform movably supported above said base on said levers, weighing spring means serving to resist deflection of said weighing levers under weight applied to the platform, a rotatable weight indicating dial, rack and pinion means movable in response to deflection of said weighing levers and connected to transmit rotation to said dial through an angularity in direct proportion to the weight applied to the platform so as to give an accurate weight indication, and a horizontally reciprocable plate in substantially parallel relationship to said base through which the weighing levers are connected with the weighing spring means and upon which the aforesaid rack rests for reciprocatory motion in each weighing operation, the rack having a lost-motion connection with said plate in a slot provided in the latter longitudinally thereof, the improvement which consists in providing spring means affording two-way spring cushioning of the rack in its lost-motion relative to the plate while insuring full return of the rack to one end of said slot in each weighing operation.

6. A weighing scale as set forth in claim 5 including means for positively limiting rotation of said weight indicating dial but only after more than a full turn in either direction, whereby to further protect the rack and pinion from destructive shear load in the event of maltreatment of the scale.

7. A weighing scale as set forth in claim 5 including a dial adapter on which said weight indicating dial is mounted, said adapter being fixed to turn with the pinion, a floating rotary elongated stop plate rotatable relative to said pinion, said stop plate having spaced stops on the pivoted end thereof engageable after lost-motion in either direction with opposite sides of a stop projection on said dial adapter to account for one portion of the free turning of said dial, said stop plate having a stop on its outer end arranged to strike either side of a fixed stop to account for a second and greater portion of the free turning of said dial.

8. A weighing scale as set forth in claim 5 including means for positively limiting rotation of said weight indicating dial but only after at least a full turn in either direction, this free turning of the dial coupled with the spring restrained lost-motion of the rack protecting the rack and pinion from shear load in the event of maltreatment of the scale.

9. A weighing scale as set forth in claim 1 wherein the last mentioned spring is an elongated wire spring mounted on said plate and extending transversely relative to the slot in spaced relation to the return end thereof and fixed at one end and guided at its other end for oscillation in substantially parallel relation to said plate.

10. A weighing scale as set forth in claim 1 wherein the last mentioned spring is an elongated wire spring mounted on said plate and extending transversely relative to the slot in spaced relation to the return end thereof and having a right angle bent portion at one end for pivoting the same relative to said plate and functioning as a torsion bar to spring load the wire spring while the other end is guided for oscillation in substantially parallel relation to said plate.

11. A weighing scale as set forth in claim 1 wherein the last mentioned spring is an elongated wire spring mounted on said plate and extending transversely relative to the slot in spaced relation to the return end thereof and having a right angle bent portion at one end for pivoting the same relative to said plate and functioning as a torsion bar to spring load the wire spring while the other end is guided for oscillation in substantially parallel relation to said plate, the right angle bent portion having a radius arm thereon which after preloading of the wire spring by angular motion relative to said plate is secured to said plate in preload condition.

12. A weighing scale as set forth in claim 1 wherein the last mentioned spring is an elongated wire spring mounted on said plate and extending transversely relative to the slot in spaced relation to the return end thereof and having a right angle bent portion at one end for pivoting the same relative to said plate and functioning as a torsion bar to spring load the wire spring while the other end is guided for oscillation in substantially parallel relation to said plate, the right angle bent portion having a radius arm thereon which after preloading of the wire spring by angular motion relative to said plate is secured to said plate in preload condition, the free end of said radius arm having an eye thereon onto which one end of the first named light spring, which is a coiled tension spring, is connected.

13. In a weighing scale comprising a base, weighing levers fulcrumed thereon, a platform movably supported above said base on said levers, weighing spring means serving to resist deflection of said weighing levers under weight applied to the platform, a rotatable weight indicating dial, rack and pinion means movable in response to deflection of said weighing levers and connected to transmit rotation to said dial through an angularity in direct proportion to the weight applied to the platform so as to give an accurate weight indication, and a horizontally reciprocable plate in substantially parallel relationship to said base through which the weighing levers are connected with the weighing spring means and upon which the aforesaid rack rests for reciprocatory motion in each weighing operation, the rack having a lost-motion connection with said plate in a slot provided in the latter longitudinally thereof, the improvement which consists in providing, in combination, a relatively light spring connected with said rack tneiding normally to return the rack to one end of said slot, means for positively limiting rotation of said weight indicating dial but only after at least a full turn in either direction, this free turning of the dial coupled with the spring restrained lost-motion of the rack protecting the rack and pinion from shear load in the event of maltreatment of the scale, and another spring means at the end of the slot toward which the relatively light spring acts to return the rack, the second spring means being mainly for cushioning action to prevent damage in the event of violent return of the rack, and having no yield in transmitting weight indicating movement to said rack from said plate in a normal weighing operation.

* * * * *